US008875186B2

(12) United States Patent
Murakami

(10) Patent No.: US 8,875,186 B2
(45) Date of Patent: Oct. 28, 2014

(54) APPARATUS AND METHOD OF PROVIDING A RECOMMENDED BROADCAST PROGRAM

(75) Inventor: Tomoko Murakami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1456 days.

(21) Appl. No.: 12/028,950

(22) Filed: Feb. 11, 2008

(65) Prior Publication Data

US 2008/0196064 A1    Aug. 14, 2008

(30) Foreign Application Priority Data

Feb. 14, 2007    (JP) .................................. 2007-033933

(51) Int. Cl.
G06F 13/00 (2006.01)
H04N 7/16 (2011.01)
H04N 21/482 (2011.01)
H04N 21/466 (2011.01)

(52) U.S. Cl.
CPC ........... *H04N 7/163* (2013.01); *H04N 21/4826* (2013.01); *H04N 21/466* (2013.01)
USPC ................... 725/45; 725/44; 725/46; 725/51; 725/52; 725/53

(58) Field of Classification Search
USPC ............................................. 725/33, 35, 120
See application file for complete search history.

(56) References Cited

U.S. PATENT DOCUMENTS

| 6,408,437 | B1 * | 6/2002 | Hendricks et al. | 725/132 |
| 7,165,069 | B1 * | 1/2007 | Kahle et al. | 1/1 |
| 7,617,127 | B2 * | 11/2009 | Hunt et al. | 705/26.61 |
| 2003/0028889 | A1 * | 2/2003 | McCoskey et al. | 725/91 |
| 2003/0066068 | A1 * | 4/2003 | Gutta et al. | 725/9 |
| 2006/0212900 | A1 * | 9/2006 | Ismail et al. | 725/34 |
| 2007/0288965 | A1 * | 12/2007 | Murakami et al. | 725/46 |
| 2010/0313215 | A1 * | 12/2010 | McCoskey et al. | 725/31 |

FOREIGN PATENT DOCUMENTS

JP    2000-115098    4/2000

OTHER PUBLICATIONS

Barabasi and Albert, Emergence in Scaling Random Networks, 1999, vol. 286, pp. 509-512.
Watts, Networks Dynamics and the Small World Phenomenon, American Journal of Sociology, 1999, Vo. 105, No. 2, pp. 493-527.

* cited by examiner

Primary Examiner — Jun Fei Zhong
(74) Attorney, Agent, or Firm — Amin, Turocy & Watson, LLP

(57) ABSTRACT

Described herein is an apparatus that provides recommended program information based on a viewing history of an audience. The apparatus includes an extractor to extract, based on a specific performer whom a viewing audience likes, a similar performer. The extractor extracts the similar performer using a relation between a plurality of performers. The extractor selects a node satisfying a first condition that a number of links between a first node corresponding to the specific performer and one or more second nodes corresponding to the similar performer is not more than a predetermined upper limit and a second condition that the number of links between the first node and second nodes is not more than a threshold from the second nodes. The apparatus also includes a selector to select a recommended program from a plurality of broadcast planned programs, and a creator to create the recommended program information.

20 Claims, 8 Drawing Sheets

| Program ID | Airdate | Broadcast station | Showtime | Ending time | Genre | Title | Performer |
|---|---|---|---|---|---|---|---|
| .. | | | | | | | |
| 15259 | 2005 / 7 / 22 | Broadcast station a | 12:00 | 13:00 | Western music | Western music program S | Presenter D、Presenter F、Musician A、… |
| .. | | | | | | | |
| 24014 | 2005 / 7 / 26 | Broadcast station b | 19:00 | 20:00 | Western music | Western music program U | Musician B、… |
| .. | | | | | | | |
| 3746 | 2005 / 7 / 29 | Broadcast station d | 10:00 | 12:00 | Western music | Western music program W | Presenter D、Musician G、… |
| .. | | | | | | | |
| 15200 | 2005 / 7 / 30 | Broadcast station a | 21:00 | 23:00 | Western music | Western music program T | Presenter D、Band L、… |
| .. | | | | | | | |
| 15248 | 2005 / 7 / 30 | Broadcast station b | 21:00 | 22:00 | Cooking | Western music program V | Presenter D、Musician C、… |
| .. | | | | | | | |
| 32012 | 2005 / 8 / 22 | Broadcast station a | 21:00 | 24:00 | Western music | Western music program X | Presenter M、Musician A、Musician N、Musician O、… |
| .. | | | | | | | |

F I G. 2

| Program ID | Viewing audience | Video recoding | Airdate | Broadcast station | Showtime | Ending time | Genre | Title | Performer |
|---|---|---|---|---|---|---|---|---|---|
| .. | | | | | | | | | |
| 276 | F | F | 2005/1/18 | Broadcast station c | 04:30 | 08:15 | News | □□□ | XXX, XXX, XXX |
| .. | | | | | | | | | |
| 9832 | F | F | 2005/1/18 | Broadcast station b | 11:25 | 11:55 | Information | △△△ | XXX, XXX, XXX |
| .. | | | | | | | | | |
| 15259 | T | F | 2005/7/22 | Broadcast station a | 12:00 | 13:00 | Western music | Western music program S | Presenter D,Presenter F,Musician A,... |
| .. | | | | | | | | | |

F I G. 3

| Program ID | Airdate | Broadcast station | Showtime | Ending time | Genre | Title | Performer |
|---|---|---|---|---|---|---|---|
| 32012 | 2005/8/22 | Broadcast station a | 21:00 | 24:00 | Western music | Western music program X | Presenter M, Musician A, Musician N, Musician O, ... |
| 24014 | 2005/7/26 | Broadcast station b | 19:00 | 20:00 | Western music | Western music program U | Musician B, ... |
| 3746 | 2005/7/29 | Broadcast station d | 10:00 | 12:00 | Western music | Western music program W | Presenter D, Musician G, ... |
| .. | | | | | | | |
| .. | | | | | | | |
| .. | | | | | | | |

F I G. 10

APPARATUS AND METHOD OF PROVIDING A RECOMMENDED BROADCAST PROGRAM

CROSS-REFERENCE TO RELATED APPLICATIONS

This application is based upon and claims the benefit of priority from prior Japanese Patent Application No. 2007-033933, filed Feb. 14, 2007, the entire contents of which are incorporated herein by reference.

BACKGROUND OF THE INVENTION

1. Field of the Invention

The present invention relates to an apparatus and method for providing recommended information related to a recommended broadcast program selected from broadcast scheduled programs.

2. Description of the Related Art

In recent years, attracted is a technique of selecting a broadcast program from broadcast scheduled programs in consideration with preference of a user and recommending it for the user. A conventional program recommendation technique is divided into collaborative filtering and contents base filtering widely.

The collaborative filtering is a method for accumulating watching and hearing histories about many viewing audiences, selecting from those viewing audiences a viewing audience having the watching and hearing history similar to the watching and hearing history of the viewing audience for which the program is to be recommended, and assuming the watching and hearing program of the selected viewing audience to be a program to be recommended.

The contents base filtering is a method for obtaining information on a feature (attribute) for explaining the taste of the viewing audience from attribute information on the watching and hearing history of the viewing audience, and attribute information on a watched and heard program, accumulating these information as a user profile and selecting a program to be recommended based on the user profile.

However, in these conventional program recommendation techniques, when a niche program that is not almost broadcasted is a program which a certain audience likes, it is difficult to recommend a program congenial to the taste concerning such a niche program indicating a minor program whose viewing rate is low.

The niche program is, for example, a program that a certain viewing audience tends to watch and hear willingly and a performer who appears on a TV program with a little frequency appears on. The performer who appears on the TV program with a little frequency is referred to as a niche performer. The viewing audience having the taste to watch and hear the niche program can be referred to as a niche viewing audience. Similarly the other attribute such as genres aside from the performer is referred to as a niche attribute. In other words, in collaborative filtering, since the data of viewing audiences who tend to watch and hear the niche program is little in number, it is difficult to elect other viewing audiences having a watching and hearing history similar to the niche viewing audience. Therefore, it is difficult to recommend a program for the niche audience.

In the contents filtering, because it is rare that information concerning the program of broadcast schedule includes the niche attribute that the viewing audience to be a recommendation object likes, it is difficult to recommend a program for the viewing audience. For example, when the niche performer of the name of "oooo" is registered with one of a user profile of a certain viewing audience, it is rare that a program having the name of the "oooo" as a performer attribute is included in information on the broadcast scheduled program. Therefore, an effective program cannot be recommended.

As described above, it is difficult that the conventional system of recommending a broadcast program recommends a program according to a personal niche of the viewing audience.

The object of the present invention is to provide a recommended program information providing apparatus capable of recommending a program for a personal niche viewing audience in effective and a method for the same.

BRIEF SUMMARY OF THE INVENTION

An aspect of the present invention provides a recommended program information providing apparatus comprising: an extractor to extract, based on first performer information indicating a specific performer appeared on a program which a viewing audience watched and heard, second performer information indicating one or more similar performers similar to the specific performer, using performer relation information indicating a relation between a plurality of performers and described as a network having a structure that a first node corresponding to the specific performer and second nodes corresponding to the similar performers are connected with links, respectively, the extractor selecting, from the second nodes, one or more nodes satisfying a first condition that a link distance representing a link number with respect to the first node is not more than a predetermined upper limit and a second condition that the number of links between the first node and the second nodes is not more than a threshold from the second nodes excepting the first node to make one or more performers corresponding to the selected one or more node one or more similar performers indicated by the second performer information; a selector to select a recommended program to be recommended for the viewing audience from a plurality of broadcast planned programs, based on broadcast planned program information describing the first performer information, the second performer information and third performer information indicating a performer appearing on the program about each of the plurality of broadcast planned programs; and a creator to create recommended program information including information concerning the selected recommended program.

BRIEF DESCRIPTION OF THE SEVERAL VIEWS OF THE DRAWING

FIG. 2 is a diagram showing an example of TV program information.

FIG. 3 is a diagram illustrating an example of watching and hearing history information of a certain viewing audience concerning the TV program information shown in FIG. 2.

FIG. 10 is a diagram illustrating an example of recommended program information.

DETAILED DESCRIPTION OF THE INVENTION

There will be described an embodiment with reference to drawings. There is described an example of selecting and recommending televised contents (television program) congenial to the taste of the viewing audience hereinafter. However, the present embodiment is not limited to the televised contents and can be directed to general broadcast contents (for example, program of satellite broadcasting, program of cable broadcasting, program of Internet broadcast).

Figure 1:
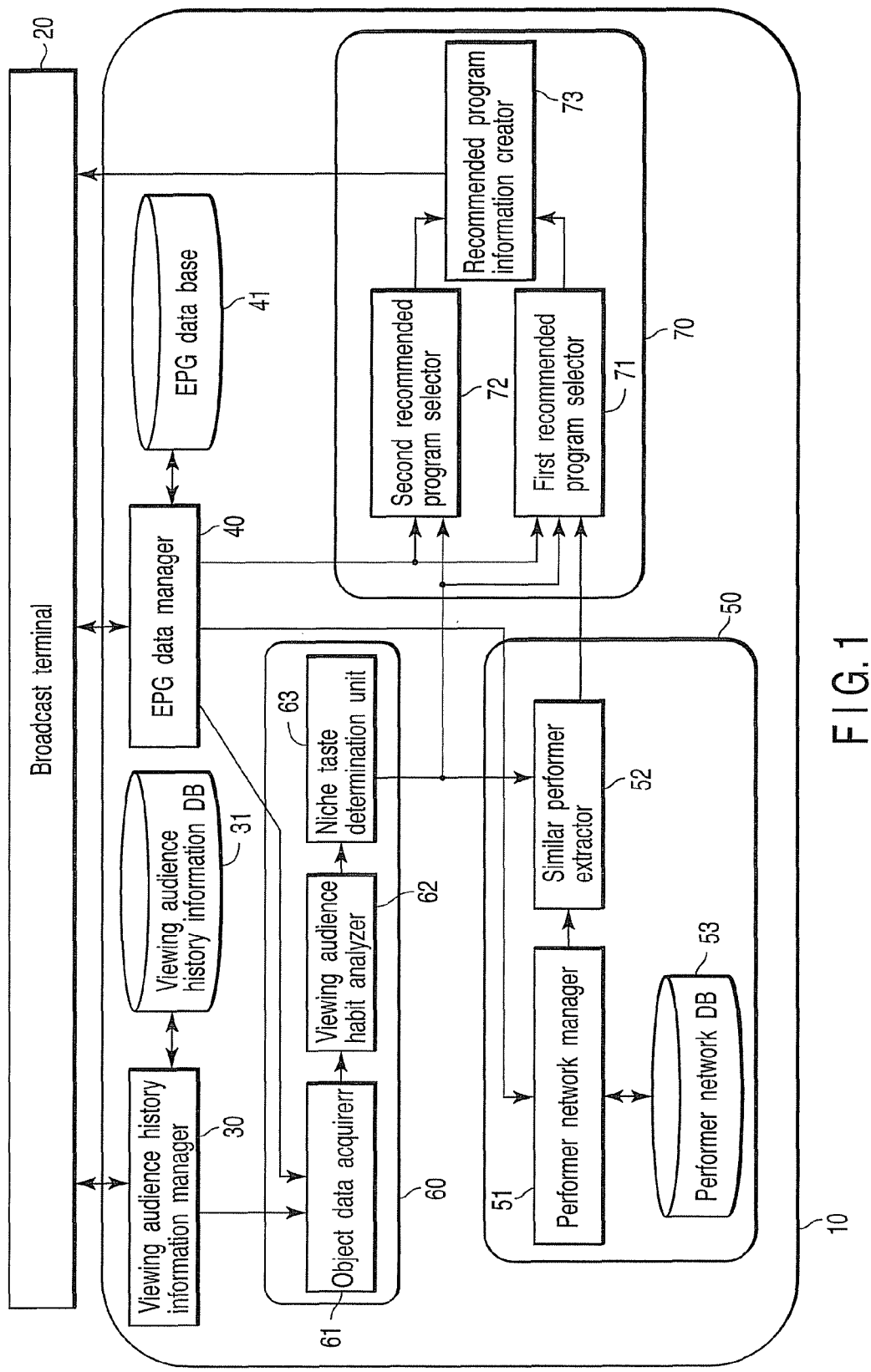
FIG. 1 is a block diagram showing of a recommended program information providing apparatus according to an embodiment.

As shown in FIG. 1, a recommended program information providing apparatus 10 of the present embodiment comprises a viewing audience history information manager 30, a EPG data manager 40, a performer information processor 50, a feature extraction processor 60, a recommended program information processor 70. The recommended program information providing apparatus creates recommended program information based on the electronic program guide data (referred to EPG data hereinafter) acquired by a broadcast terminal 20. The broadcast terminal 20 displays the recommended program information using the EPG data or performs other processing such as automatic video recording based on the recommended program information. Alternatively, the broadcast terminal 20 provides the recommended program information to another equipment, for example, equipment for displaying the recommended program information or performing other processing such as automatic video recording based on the recommended program information.

The recommended program information providing apparatus may be built in the broadcast terminal 20, and may be independent from the broadcast terminal 20. The latter recommended program information providing apparatus provides with a user interface to communicate with the broadcast terminal 20. The broadcast terminal 20 acquires the EPG data by receiving it from external broadcast equipment, and acquires the watching and hearing history information of the viewing audience by, for example, television operation thereof or from other equipment.

In FIG. 1, the recommended program information providing apparatus may be configured to receive the EPG data and/or watching and hearing history information from an apparatus aside from the broadcast terminal 20 or provide the recommended program information to an apparatus aside from the broadcast terminal 20.

In the present embodiment, since a TV program is used as contents for broadcast, the EPG data, watching and hearing history information of the viewing audience and recommended program information described hereinafter relate to the TV program. However, they are not limited to contents illustrated by an example in the present embodiment, and may be information having various formats and definitions. Also, they can be input in various kinds of forms such as key-in input, remote control input, and online input via network, and reading from a magnetic tape which is medium for communication.

The EPG data manager 40 receives EPG data from the broadcast terminal 20, manages it and updates it regularly. The EPG data input to the EPG data manager 40 is recorded on an EPG data database 41. The viewing audience history information manager 30 receives viewing audience history information of the viewing audience from the broadcast terminal 20, manages it and updates it regularly. The viewing audience history information input to the viewing audience history information manager 30 is recorded on the viewing audience history information database (viewing audience history information DB) 31.

A performer information processor 50 includes a performer net manager 51, a similar performer extractor 52, a performer network database (performer network DB) 53 as shown in FIG. 1. The performer information processor 50 builds up a performer network at a specified timing on the basis of the EPG data for a past certain period. When the feature extraction processor 60 determines the feature information indicates a niche taste as described hereinafter, a similar performer is extracted based on the performer attribute and performer network contained in the feature information.

The feature extraction processor 60 extracts feature information including the program attribute featuring the watching and hearing habit of the viewing audience, based on the EPG data for a past certain period and viewing audience history information, and determines whether the extracted feature information including a performer attribute indicates the niche taste. The feature extraction processor 60 includes an object data acquirer 61, a viewing audience habit analyzer 62, and a niche taste determination unit 63 as shown in FIG. 1.

The recommended program information processor 70 selects a program congenial to the audience's taste as a program to be recommended, based on the EPG data concerning a program of recommended candidate, feature information provided from the feature extraction processor 60 and similar performer information extracted with the performer information processor 50, and creates recommended program information including information concerning the selected recommended program.

The recommended program information processor 70 includes a first recommended program selector 71 for selecting a recommended program based on the feature information indicating the niche taste and including the performer attribute and similar performer information, a second recommended program selector 72 for selecting a recommended program by a given method with respect to the feature information not indicating the niche taste, and a recommended program information creator 73 for creating the recommended program information based on the selected result of the recommended program from the first recommended program selector 71 and the selected result of the recommended program from the second recommended program selector 72.

The EPG data (TV program information) illustrated in FIG. 2 include a program ID, an airdate, a broadcast station, a showtime, a end time, a genre, a title, an attribute value of each program attribute of a performer for every one program. In an operative example shown in FIG. 2, the EPG data include airdate="Jul. 22, 2005", broadcast station attribute="broadcast station a", showtime attribute="12:00", end time attribute="13:00", genre attribute="Western music", title attribute="Western music program S", performer attribute="emcee D", emcee F, musician A in the program ID="15259", for example.

The genre of the program may use any attribute value such as "news", "Western music", "cooking", "information", "sports", "drama", "music", "variety", "movie", "cartoon film", "documentary", and "hobby". The format of FIG. 2 may includes various kinds of information such as a channel cord, a key word included in program contents, a comment sentence concerning a program or URL of a homepage relevant to the program. A part (for example, showtime attribute and end time attribute) of information of FIG. 2 may be omitted if it can be obtained, for example, a program ID as a key from the database provided in the recommended program information providing apparatus or other apparatus.

The viewing audience history information of a certain viewing audience with respect to the EPG data illustrated in FIG. 2 is shown in FIG. 3. The viewing audience history information illustrated in FIG. 3 includes a program ID, presence of the viewing audience, video recording, and an attribute of an airdate, a broadcast station, a showtime, an end time, a genre, a title and a performer for every program. When the video recording is not carried out, an attribute on presence of the video recording is unnecessary.

When the attribution is "T" (TRUE), it indicates that the watching and hearing or video recording was done with respect to the program. When the attribute is "F" (FALSE), it indicates that the watching and hearing or video recording was not done with respect to the program. For example, in the operative example shown in FIG. 3, the program ID="15259 (airdate="Jul. 22, 2005", broadcast station attribute="broadcast station a", showtime attribute="12:00", end time attribute="13:00", genre attribute="western music", title attribute="western music program S", performer attribute="emcee D", emcee F, musician A) indicates that the viewing audience watched and heard. In this example, the video recording is not done.

The format of FIG. 3 is one example, and may include various kinds of information such as channel cords. A part of information of FIG. 3 (for example, the genre attribute and performer attribute) may be omitted if it can be acquired from the database provided in the recommended program information providing apparatus or another apparatus using the program ID as a key.

The operation of the recommended program information providing apparatus related to the present embodiment is described hereinafter. At first, a process for building a performer network in the performer information processor 50 of the recommended program information providing apparatus related to the present embodiment is described hereinafter.

The network building process may be executed at a suitable timing. The network building process may be performed at the time of execution of, for example, the procedure (FIG. 11) of creating recommended program information. Further, it may be done for every constant frequency or whenever the EPG data manager 40 obtains new EPG data, otherwise whenever a fixed quantity of new EPG data is accumulated in the EPG database 41, regardless of execution of the procedure (FIG. 11) of creating recommended program information.

The performer net administration unit 51 of the performer information processor 50 reads the EPG data for a past certain period from the EPG data manager 40, and builds a performer network based on this EPG data. An example of the performer network and an example of the building method thereof are described in this embodiment. The performer network is assumed to be defined in a network structure indicating each performer as a node and a correlation between the performers as a link.

The performer network manager 51 arranges n nodes in a circular form, and builds the initial state of the performer network by providing a link so that each node is connected to right and left k (k is even number) other nodes (total 2k nodes). k is assumed to be an even number.

Figure 4:
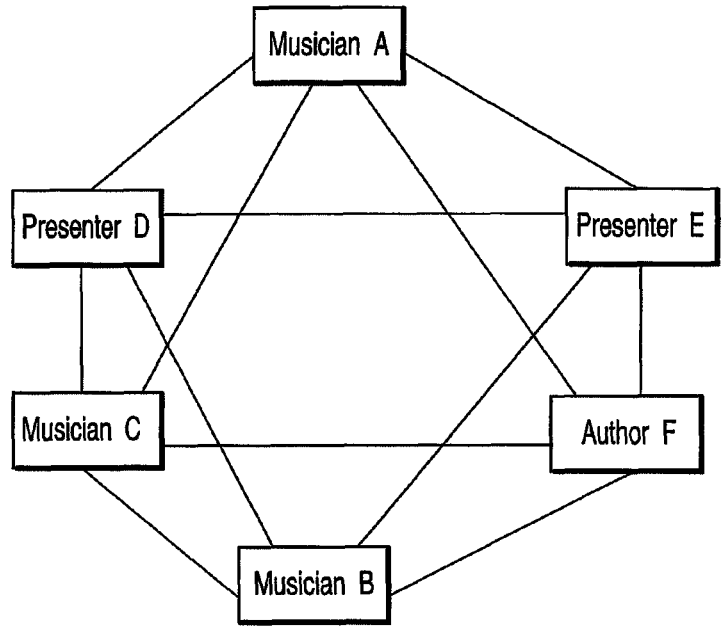
FIG. 4 is a diagram illustrating an example of a certain performer network used in the embodiment.

An example of an initial state in the case of n=6 and k=4 is shown in FIG. 4. n and k may set appropriately. When The total number of performers included in the object EPG data exceeds n, only n performers have only to be selected with suitable criterion (for example, in order of decreasing number of performing programs). Even if the total number of performers included in the object EPG data does not exceed n, the performer that the number of performing programs does not reach a predetermined reference value in the EPG data may be excluded from an object.

For each link of the performer network, the link between the performers is changed based on a correlation degree between the performers connected to the link. The change of link is to fix a node connected to one end of the object link and select once again a node connected to the other end thereof. In the embodiment, an example of a correlation degree between performers is assumed to use a costarring frequency. The following various kinds of values are conceivable as the costarring frequency.

(1) The number of programs having two specific performers A and B of all programs contained in the object EPG data as the performer attribute at the same time, that is, the number of programs F1 that the specific performers A and B costar with, (2) The value F2 (=F1/N) obtained by dividing this F1 by the total number N of all programs contained in the EPG data, (3) The value F3 obtained by dividing the F1 regarding each pair of costars by the maximum of the numbers of programs F1 concerning all pairs of costars or the average of them, and (4) The value obtained by dividing the number of s2 of programs having the performers A and B as the performer attribute by the number s1 of programs having the performer A as the performer attribute, in all programs contained in the EPG data, that is, the probability F4 at which the performer B appears on the program on which the performer A appeared.

Figure 5:
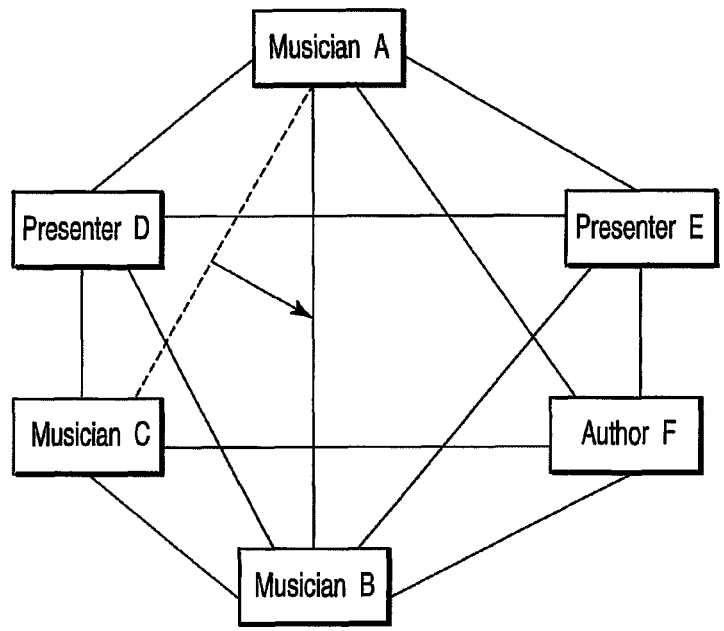
FIG. 5 is a diagram illustrating an example of changing a join of a performer network used in the embodiment.

For example, in the example of FIG. 4, assuming that the frequency at which the "musician A" costars with the "musician C" is low, and the frequency at which the "musician A" costars with the "musician B" is high, if the "musician B" having the high costarring frequent to the "musician A" is linked to the "musician A", the link between the "musician A" and the "musician C" that the costarring frequency is low is deleted, and a link is build between the "musician A" and the "musician B" newly. In other words, the "musician A" node connected to one end of the link is fixed, and the node connected to the other end of the link is switched from the "musician C" to the "musician B". This state is shown in FIG. 5. If there is no performer indicating high costarring frequent between the "musician A" and other performers, or a link has been already built between the performers having high costarring frequency, the link between "musician A" and "musician C" is deleted.

Figure 6:
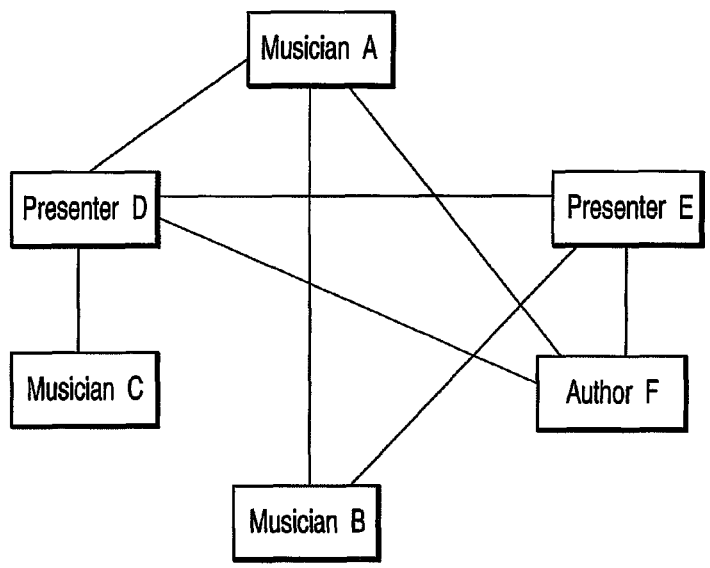
FIG. 6 is a diagram illustrating an example of a performer network which is finally provided according to a result of join changing of a performer network used in the embodiment.

By carrying out such a process for all links sequentially, a performer network is built. An example of a built performer network is shown in FIG. 6. The built performer network is stored in the performer network database 53. FIGS. 4 to 6 illustrate performer networks typically, and actually the network is described in the form that can be treated with a computer.

In the above description, the costarring frequency is used as an example of correlation degree between the performers, but another evaluation value may be used. Also, the correlation degree between the performers is obtained together with the EPG data, but the correlation degree may be obtained from other information such as a TV program performer database. Further, information indicating the correlation degree between the performers may be acquired from the outside.

In the above description, there is described a method of building the performer network according to the small world network proposed by Watts et al. (for example, documents "D. J. Watts: "NetWorks, dynamics and the small world phenomenon", American Journal of Sociology, Vol. 105, No. 2, pp. 493-527, (1999), the contents of which are incorporated here in by reference, illustrated a method to make the performer network that almost obeyed). However, it is possible to define the performer network by another method such as a scale-free network proposed by Barabasi et al. (for example, "A. L. Barabasi and R. Albert: "Emergence in scaling random networks", Science, Vol. 286, pp. 509-512, (1999), the contents of which are incorporated here in by reference.

In the above description, the performer network manager 51 builds the performer network. However, the performer network manager 51 may acquire the performer network built on a broadcast contents creator and so on and store it in the performer network database 53.

Figure 7:
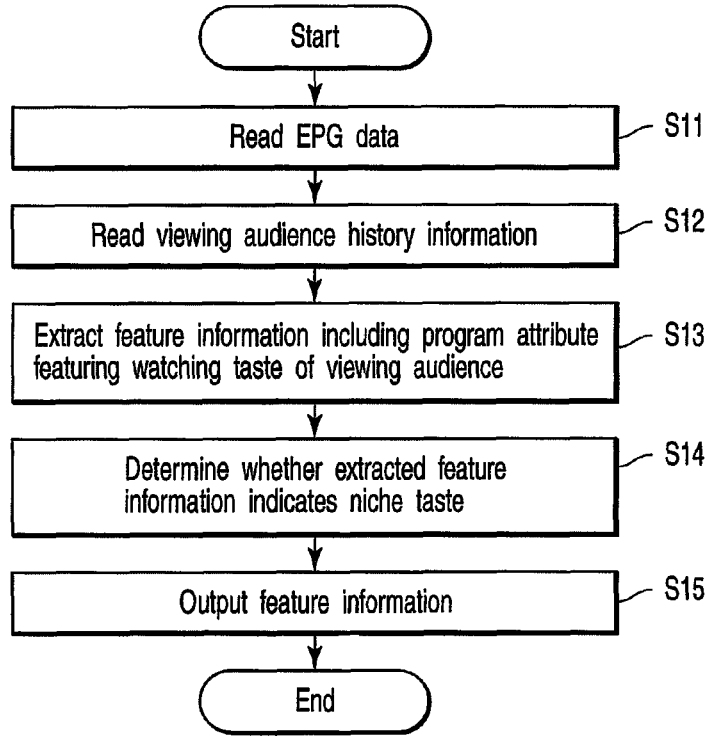
FIG. 7 is a flow chart indicating a procedure for extracting feature information in a feature extractor of the recommended program information providing apparatus and determining whether it indicates a niche taste.

A process in the feature extraction processor 60 is explained hereinafter. The feature extraction processor 60 extracts the feature information featuring the viewing audience habit based on the EPG data for a past certain period and the viewing audience history information, and determines whether the extracted feature information indicates the niche taste. A procedure of extracting the feature information and determining whether it indicates the niche taste in the feature extraction processor 60 is shown in FIG. 7.

The object data acquirer 61 of the feature extraction processor 60 reads the EPG data for the past certain period from the EPG data manager 40 (step S11). The object data acquirer 61 reads the viewing audience history information for a past certain period from the viewing audience history information manager 30 (step S12). The past certain period may be set appropriately to a period such as one month, three months, six months, one year. Steps S11 and S12 may be replaced in execution sequence arbitrarily or executed in parallel.

The viewing audience habit analyzer 62 analyzes the watching and hearing habit of the viewing audience based on the acquired viewing audience history information, and extracts the feature information including the program attribute featuring the watching and hearing habit (step S13). When a necessary attribute is not contained in the viewing audience information, it is acquired from the database provided in the recommended program information providing apparatus or another database using, for example, the program ID as a key.

For example, when the genre attribute and/or performer attribute is not included in the viewing audience history information but the genre attribute and/or performer attribute is included in the EPG data, the genre attribute and/or performer attribute has only to be acquired from the EPG data using the program ID as a key. The performer attribute is assumed to be included in the feature information at least.

In an extraction process of feature information, if the total number of all programs contained in the viewing audience history information, the total number of programs which the viewing audience watched and heard or recorded, or the total number of programs which the viewing audience watched and heard without video recording is M, and a set of a specific performer attribute value and a specific genre attribute value or the total number of programs having the specific performer value is m, such set of performer attribute and genre attribute that m/M becomes not less than a predetermined threshold may be the program attribute featuring the watching and hearing habit of the viewing audience.

Feature information including the program attribute featuring the watching and hearing habit of the viewing audience may be extracted by another method such as a method using a taste model expressed in a Bayesian network. For example, it is assumed that feature information indicating the genre attribute of "Western music" and the performer attribute of "musician A", and feature information indicating the genre attribute of "variety" and the performer attribute of "emcee D" are extracted.

The niche taste determination unit 63 determines whether the extracted feature information indicates the niche taste referring to the acquired EPG data (step S14). For example, the total number of all programs contained in the EPG data is assumed to be N. The program attribute included in the extracted feature information is compared with the program attribute of each program contained in the EPG data to obtain a frequency n in which a program having a set of the same program attributes as that contained in the feature information appears in the EPG data. When n/N becomes not more than a predetermined threshold t, the feature information is determined to indicate the niche taste. If not so, it is determined not to indicate the niche taste.

In the case of the above operative example, the number of programs in which a genre attribute is "western music" and the performer attribute is "musician A" is examined referring to EPG data. When the examination result is n/N=0.01 (i.e., there is one of 100 programs in EPG data), if the threshold t=0.1, n/N≤t2 is satisfied. In this case, it is determined that the program attribute {genre attribute="Western music", the performer attribute="musician A"} contained in the characteristic information indicates a niche taste. In other words, it is determined that the program having the program attribute {genre attribute="Western music", the performer attribute="musician A"} contained in feature information is a niche program.

The number of programs in which the genre attribute is "variety" and the performer attribute are "emcee D" is examined. When the examination result is n/N=0.20, namely there is one of 100 programs in the EPG data, if the threshold t=0.1, n/N≤t2 is not satisfied. Therefore, it is determined that the program attribute {the genre attribute="variety", the performer attribute is "emcee D"} included in the feature information does not indicate the niche taste. In other words, it is determined that the program having the program attribute {the genre attribute="variety", the performer attribute="emcee D"} included by the feature information is not a niche program.

At last, the extracted feature information is output to the first and second recommended program selector 71 and 72 of the recommended program information processor 70, and the feature information indicating the niche taste or the performer attribute included therein is output to the similar performer extractor 52 of the performer information processor 50 (step S15).

The above embodiment is directed to a pair of genre attribute and performer attribute of the program or the performer attribute, but in addition may be directed to another attribute such as a key word included in the program contents. Also, the above embodiment is assumed that the program includes at least a performer attribute, but it is not limited to such the program. In the case that the performer attribute needs not to be always included in the feature information, for example, the niche taste determination unit 63 has only to be directed to only the feature information containing the performer attribute when determining whether it indicates the niche taste. On the other hand, the feature information containing no performer has only to be treated as information containing no niche taste.

The similar performer extraction process in the performer information processor 50 is explained hereinafter. In this similar performer extraction process, the feature information that the feature extraction processor 60 determined as a niche taste is extracted. This process is executed when the feature information or the performer attribute included therein is applied to the similar performer extractor 52 of the performer information processor 50. The similar performer extractor 52 extracts a performer (referred to as a similar performer hereinafter) similar to the performer (referred to as a niche performer) included in the feature information as a value of a performer attribute from a performer network.

Figure 8:
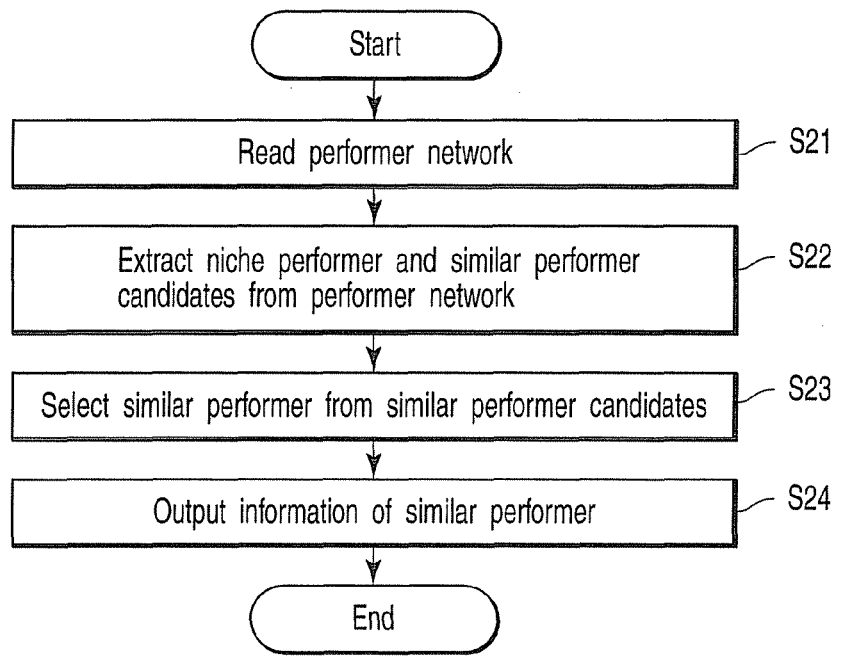
FIG. 8 is a flow chart of a procedure of extracting a similar performer in a performer information processor of a recommended program providing apparatus according to the embodiment.
Figure 9:
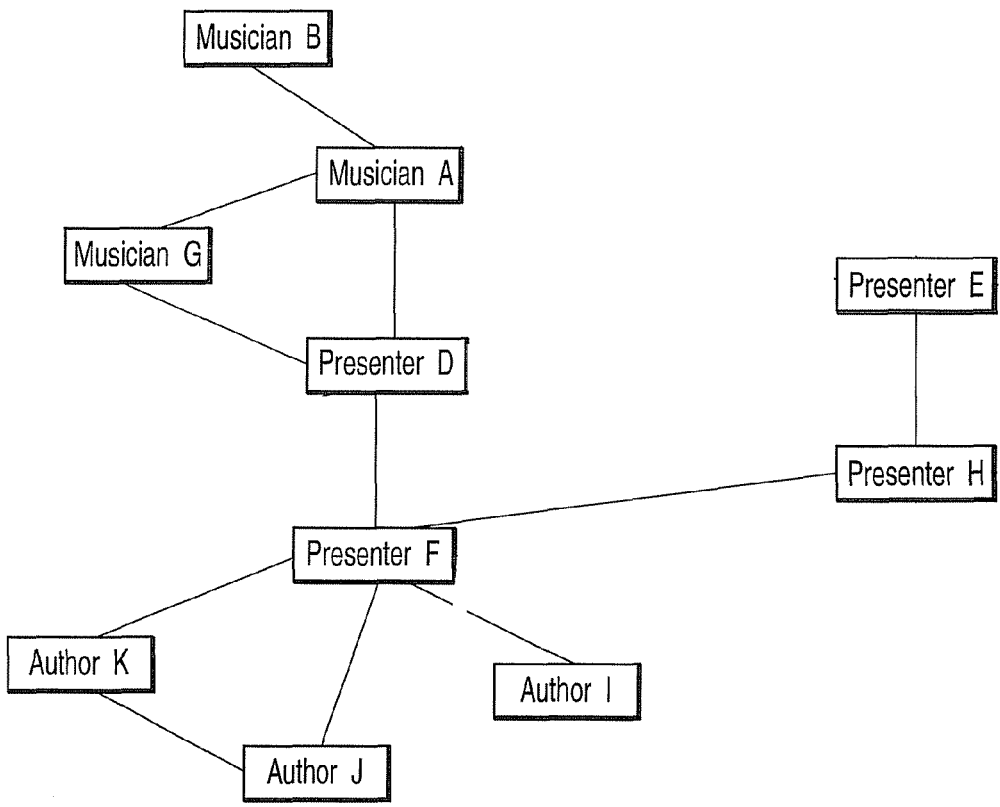
FIG. 9 is a diagram illustrating an example of a certain performer network used in the embodiment.

An example of a procedure for extracting a similar performer in the similar performer extractor 52 is shown in FIG. 8. An example of a performer network used for explanation of the procedure is shown in FIG. 9. It is assumed that the "musician A" is included in the feature information indicating the niche taste as a value of a performer attribute.

When acquiring the niche performer, the similar performer extractor 52 reads a performer network from the performer network database 53 through the performer net manager 51 (step S21). When acquiring the niche performer, the similar performer extractor 52 extracts as a candidate of the similar performer one or more other performers corrected to a link located at a distance not more than a given distance with respect to the niche performer in the performer network through the performer net manager 51 (step S22). The distance corresponds to the number of links connected between the performers, for example. The given distance is, for example, 1.

In the performer network of FIG. 9, if the given distance is assumed to be 1, the "musician B", "musician G" and "emcee D" are extracted as performers connected to the "musician A" with a link of distance=1, that is, directly with only one link. The similar performer extractor 52 selects as the similar performer only a performer of other performers (referred to as similar performer candidates) extracted as described above, which has a weaker relation with respect to the similar performer candidates (step S23).

It is assumed that the strength and weakness of relation is defined by the number of links connected to other performers viewed from the similar performer candidates. For example, about each of the extracted similar performer candidates, the number of direct connection links directly connected to other performer (including the niche performer) from the similar performer candidates is examined. When the number of direct connection links is not more than a predetermined threshold (for example, two), the similar performer candidate is selected as a similar performer (for example, 2).

For example, the average of the number of direct connection links of all performers (value determined based on the average) may be use as a threshold of the number of direct connection links. For example, in a performer network of FIG. 9, when the threshold of the number of direct connection links is assumed to be two, the "musician B" and "musician G" of the "musician B", "musician G" and "emcee D" which are similar performer candidates extracted with respect to the "musician A" are selected as similar performers, because they are not more than two in the number of links. The "emcee D" is not selected because the number of direct connection links exceeds two links of the threshold.

There is available a method that when the above-mentioned given distance is not less than two, the similar performer candidate linked via only a performer which was not finally selected while being extracted as the similar performer candidate such as this "emcee D" is not selected as a similar performer regardless of the number of direct connection links. The information of the similar performer extracted with the similar performer extractor 52 is output to the first recommended program selector 71 of the recommended program information processor 70 (step S24).

In the above description, the number of similar performers differs according to the contents of the performer network and the distance or threshold of reference of extraction or selection. However, it is possible to repeat the process as the lower limit of the number of similar performers is decided, and the distance or threshold of reference of extraction or selection is adequately adjusted (the reference is relaxed) so that the performers of the number more than this lower limit or the number approximate to the lower limit are acquired.

When the niche performer is not included in the performer network, the similar performer is not to be provided. In this case, for example, the extraction result of the similar performer has only to be output to the first recommended program selector 71 of the recommended program information processor 70 as an empty set. In this embodiment, the feature information determined to indicate the niche taste extracted with the feature extraction processor 60 is assumed to be output to the first and second recommended program selectors 71 and 72 of the recommended program information processor 70. However, the performer information processor 50 received the determined feature information from the feature extraction processor 60 may output the feature information and the extraction result of the similar performer to the first recommended program selector 71 of the recommended program information processor 70.

There will be described a process procedure of creating the recommended program information with the recommended program information processor 70 hereinafter.

The first recommended program selector 71 of the recommended program information processor 70 selects a program matching the feature information from among programs included in the EPG data regarding programs to become recommended candidates, based on the expansion feature information obtained by adding the similar performer provided from the performer information processor 50 to the performer attribute included in the feature information provided from the feature extraction processor 60 and including a niche performer as its value. Assuming that the performer attribute included in the expansion feature information is treated as an attribute featuring the watching and hearing habit of the viewing audience with respect to either the niche performer or similar performer.

When the {genre attribute="western music", performer attribute="musician A"} is provided as feature information indicating the niche taste, and the similar performer={"musician B", "musician G"} is extracted based on the niche performer="musician A", the program of program ID=32012, genre attribute="Western music", title attribute="western music program X", performer attribute={"emcee M", "musician A", "musician N", "musician O", ... }, the program of program ID=24014, genre attribute="western music", title attribute="western music program U", performer attribute={"musician B" ... }, and the program of program ID=3746, genre attribute="western music", title attribute=western music program W, performer attribute={emcee D, "musician G", ... } are selected from the EPG data illustrated in FIG. 2.

The conventional system were able to recommend only a program of title attribute="western music program X" of program ID=32012 that niche performer="musician A" whom the viewing audience likes appears on. According to the present embodiment, it is possible to recommend a program of title attribute="western music program U" of program ID=24014 and a program of title attribute="western music program W" of program ID=3746, which is a program that similar performer={"musician B", "musician G"} similar to niche performer="musician A" appears on. Also, since the "emcee D" which will appear on many programs is removed from the similar performer, it is possible to avoid recommendation of many programs which the viewing audience is not taste. In the case that the viewing audience likes the "emcee D", it is thought that the program which the "emcee D" appears on is to be recommended by the second recommended program selector 72 treating the feature information which does not indicate the niche taste.

The second recommended program selector 72 of the recommended program information processor 70 selects a program matching the feature information from among the programs included in the EPG data regarding the recommended candidate program, based on the feature information that does not indicate the niche taste and is provided from feature extraction processing component 60. For example, when feature information that the genre attribute is "variety" and the performer attribute is "emcee D" is provided, a program having genre attribute="variety" and performer attribute="emcee D" is selected.

In the present embodiment, the second recommended program selector 72 selects the recommended program based on the feature information provided from the feature extraction processing component 60. However, it is not limited to this method, and a well-known program recommending method may be used appropriately. In this case, for example, the second recommended program selector 72 may extracts the watching and hearing program of the viewing audience, and a plurality of similar programs may be selected referring to any one of a genre of those watching and hearing programs, a performer, a key word included in program contents or a plurality of combinations of them. In addition, the recommended program may be selected using a technique such as collaborative filtering.

The recommended program information creator 73 creates recommended program information including information concerning the recommended program, which is necessary for providing a recommended program to the viewing audience. In the case that the information that is not included in the EPG data is included in the recommended program information in creating the recommended information, necessary information may be acquired from the databases of a recommended program information provider or other devices using, for example, program ID as a key appropriately.

An example of recommended program information created with the recommended program information creator 73 is shown in FIG. 10. The recommended program information of FIG. 10 indicates three programs selected with the first recommended program selector 71. The recommended program information further includes a program selected with the second recommended program selector 72. The format of FIG. 10 is one example, and the recommended program information may include various information elements such as channel cords. A part of information of FIG. 10, for example, a performer attribute is assumed to be able to be acquired from the databases of the recommended program information provider or another device using the program ID as a key, and may be omitted.

The created recommended program information is given from the recommended program information processor 70 to the broadcast terminal 20. The broadcast terminal 20 provides the received recommended program information to a user. When the recommended program information is created, information of the niche performer and similar performer may be included in the recommended program information. Information for distinguishing between the program which a niche performer appears on and the program which a similar performer appears on may be added to the recommended program selected with the first recommended program selector 71. Information for distinguishing between the program selected with the first recommended program selector 71 and the program selected with the second recommended program selector 72 may be added to the recommended program. The upper limit of the number of programs described on the recommended program information may be set when the recommended program information is created. The recommended programs may be recommended ordering at a prescribed criterion.

Figure 11:
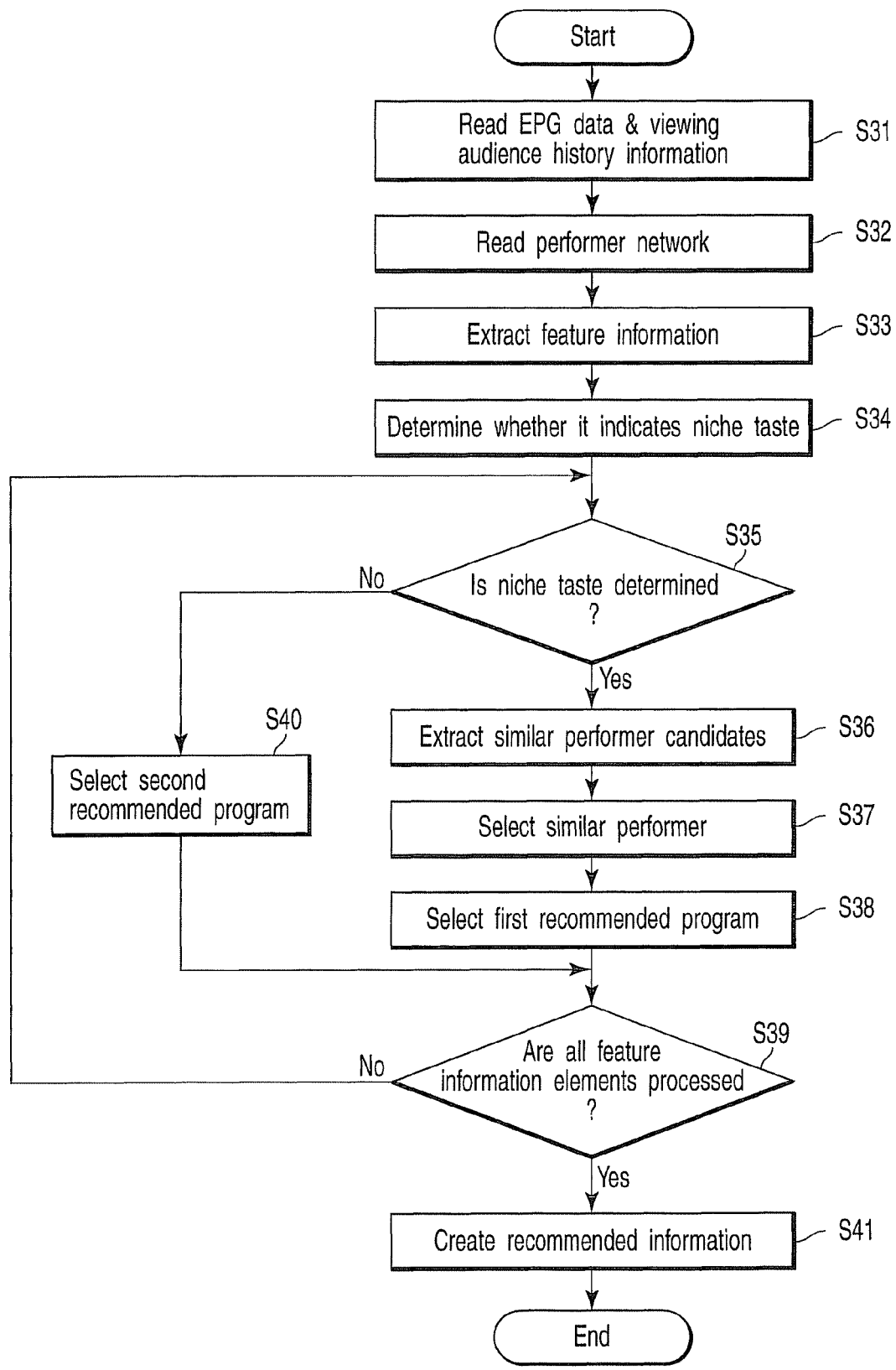
FIG. 11 is a flow chart of a procedure of creating recommended program information in a recommended program information providing apparatus according to the embodiment.

There will be described a flow of a general process when a recommended program information provider related to the present embodiment creates the recommended program information. An example of a procedure for creating the recommended program information is shown in FIG. 11.

The recommended program information processor 70 reads EPG data (EPG data as shown in FIG. 2, for example) concerning a program (referred to as an object program) of a plan broadcasted in the future that is directed to the following process and managed with the EPG data manager 40, and the object data acquirer 61 of the feature extraction processor 60 reads the EPG data and viewing audience history information for a past certain period from the EPG data manager 40 and viewing audience history information manatee 30 (step S31).

The similar performer extractor 52 of the performer information processor 50 reads a performer network from the performer network database 53 through the performer net manager 51 (step S32). The procedure of steps S31 and S32 does not always need to be performed at this timing, and may be carried out till the data are necessary.

The watching and hearing habit analyzer 62 of the feature extraction processor 60 extracts feature information including the program attribute featuring the watching and hearing habit of the viewing audience (step S33). The niche taste determination unit 63 determines whether the extracted feature information indicates the niche taste (step S34). When the niche taste determination unit 63 determines the niche taste (step S35), the similar performer extractor 52 extracts similar performer candidates (step S36), and selects a similar performer from the similar performer candidates (step S37).

The first recommended program selector 71 of the recommended program information processor 70 performs selection of a recommended program matching the expansion feature information from the programs included in the EPG data concerning the program of recommended candidate (the first recommended program selection process) based on expansion feature information obtained by adding the similar performer given from the performer information processor 50 to the performer attribute included in the feature information given from the feature extraction processor 60 and including the niche performer as its value (step S38).

When the niche taste determination unit 63 determines that the feature information does not indicate the niche taste (step S35), the second recommended program selector 72 of the recommended program information processor 70 performs selection of a recommended program matching the feature information from the programs included in the EPG data concerning the program of the recommended candidate (the second recommended program selection process) based on the feature information that does not indicate the niche taste given from the feature extraction processor 60 (step S40).

The above-mentioned loop process is done about all feature information repeatedly (step S39). If the process about all feature information is completed, the recommended program information creator 73 of the recommended program information processor 70 creates recommended program information including information concerning the recommended program, which is necessary for providing the recommended program to the viewing audience based on a selection result of all recommended program (step S41). The created recommended program information is provided from the recommended program information processor 70 to the broadcast terminal 20 (step S41). The broadcast terminal 20 provides the received recommended program information to a user.

As described above, according to the present embodiment, it become possible to perform program recommendation more effectively about an individual niche taste of the viewing audience that it was difficult to treat by a conventional program recommendation technology.

Each function described above are implemented by being written as software and processed by the computer having a suitable mechanism. Also, the embodiments can be implemented as programs for making a computer execute a predetermined procedure, for making a computer function as given means, or for making a computer realize a given function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recommended program information providing apparatus comprising:
   a memory that stores computer-executable instructions;
   a processor that facilitates execution of the computer-executable instructions to at least:
      extract a performer attribute related to a performer and a genre attribute related to a program including the performer;
      determine that the program corresponds to a niche taste based on a viewing rate of the program, the performer attribute and the genre attribute, wherein the niche taste corresponds to a low viewing rate;
      select a similar performer to the performer from a performer relation network of the performer created based on the performer attribute and the genre attribute, wherein the similar performer is associated with a similar performer attribute;
      select a program to be recommended from a plurality of programs in a program guide based on the similar performer attribute;
      determine that the program to be recommended corresponds to the niche taste; and
      recommend the program to be recommended to an audience with the niche taste.

2. A recommended program information providing apparatus comprising:
   a memory that stores computer-executable instructions;
   a processor that facilitates execution of the computer-executable instructions to at least:
      extract a performer attribute related to a performer and a genre attribute related to a program including the performer;
      generate a performer network based on the performer attribute, wherein the performer network defines relations between the performer and a plurality of other performers, wherein the performer and the plurality of other performers are defined by nodes and the relations are defined by links between the nodes, wherein the performer network is based on information indicating a frequency of appearance for the performer and the plurality of other performers from a guide for a time period;
      determine that the program corresponds to a niche taste based on a viewing rate of the program, the performer attribute and the genre attribute, wherein the niche taste corresponds to a low viewing rate;
      extract a similar performer to the performer based on the a number of links to the performer in the performer network, wherein the number of links is two or less;
      select a program to be recommended based on the similar performer from a program guide;
      determine that the program to be recommended corresponds to the niche taste; and
      recommend the program to be recommended to an audience with the niche taste.

3. The apparatus according to claim 1, wherein the processor further facilitates the execution of the instructions to determine that the program corresponds to a niche taste based on a frequency of appearance of the performer attribute and the genre attribute being less than or equal to a prescribed threshold.

4. The apparatus according to claim 1, wherein the processor further facilitates the execution of the computer-executable instructions to: generate the performer relation network that defines relations between the performer and a plurality of other performers, wherein the performer and the plurality of other performers are defined by nodes and the relations are defined by links between the nodes.

5. The apparatus according to claim 4, wherein the processor further facilitates the execution of the computer-executable instructions to determine a degree of correlation between the performer and at least one of the plurality of performers based on a number of connecting links between corresponding nodes.

6. The apparatus of claim 1, wherein the similar performer is a frequent co-star of the performer.

7. The apparatus of claim 1, wherein the processor further facilitates the execution of the computer-executable instructions to:
   select a non-niche performer that is similar to the performer from the performer relation network of the performer without considering the niche taste;
   select a second program to be recommended from a plurality of programs in a program guide based on a performer attribute corresponding to the non-niche performer; and
   recommend the second program to be recommended to the audience with the niche taste.

8. The apparatus according to claim 2, wherein the number of links is 1.

9. The apparatus of claim 8, wherein the similar performer is a frequent co-star of the performer.

10. The apparatus of claim 8, wherein the processor further facilitates the execution of the computer-executable instructions to:

select a non-niche performer that is similar to the performer from the performer relation network of the performer without considering the niche taste;
select a second program to be recommended from a plurality of programs in a program guide based on a performer attribute corresponding to the non-niche performer; and
recommend the second program to be recommended to the audience with the niche taste.

11. A method for providing recommended program information comprising:
extracting, by a system including a computer processor, a performer attribute related to a performer and a genre attribute related to a program including the performer;
determining, by the system, that the program corresponds to a niche taste based on a viewing rate of the program, the performer attribute and the genre attribute, wherein the niche taste corresponds to a low viewing rate;
selecting, by the system, a similar performer to the performer from a performer relation network of the performer created based on the performer attribute and the genre attribute, wherein the similar performer is associated with a similar performer attribute;
selecting, by the system, a program to be recommended from a plurality of programs in a program guide based on the similar performer attribute;
determining that the program to be recommended corresponds to the niche taste; and
recommending, by the system, the program to be recommended to an audience with the niche taste.

12. The method according to claim 11, further comprising generating, by the system, the performer relation network.

13. The method of claim 11, wherein the similar performer is a frequent co-star of the performer.

14. The method of claim 11, further comprising:
selecting, by the system, a non-niche performer that is similar to the performer from the performer relation network of the performer without considering the niche taste;
selecting, by the system, a second program to be recommended from a plurality of programs in a program guide based on a performer attribute corresponding to the non-niche performer; and
recommending, by the system, the second program to be recommended to the audience with the niche taste.

15. A method for providing recommended program information comprising:
extracting, by a system including a processor, a performer attribute related to a performer and a genre attribute related to a program including the performer;
generating, by the system, a performer network based on the performer attribute, wherein the performer network defines relations between the performer and a plurality of other performers, wherein the performer and the plurality of other performers are defined by nodes and the relations are defined by links between the nodes, wherein the performer network is based on information indicating a frequency of appearance for the performer and the plurality of other performers from a guide for a time period;
determining, by the system, that the program corresponds to a niche taste based on a viewing rate of the program, the performer attribute and the genre attribute, wherein the niche taste corresponds to a low viewing rate;
extracting, by the system, a similar performer to the performer based on the a number of links to the performer in the performer network, wherein the number of links is two or less;
selecting, by the system, a program to be recommended based on the similar performer from a program guide;
determining, by the system, that the program to be recommended corresponds to the niche taste; and
recommending, by the system, the program to be recommended to an audience with the niche taste.

16. The method of claim 15, wherein the similar performer is a frequent co-star of the performer.

17. The method of claim 15, further comprising:
selecting, by the system, a non-niche performer that is similar to the performer from the performer relation network of the performer without considering the niche taste;
selecting, by the system, a second program to be recommended from a plurality of programs in a program guide based on a performer attribute corresponding to the non-niche performer; and
recommending, by the system, the second program to be recommended to the audience with the niche taste.

18. A non-transitory computer readable storage medium storing instructions of a computer program which when executed by a computer results in performance of steps comprising:
extracting a performer attribute related to a performer and a genre attribute related to a program including the performer;
determining that the program corresponds to a niche taste based on a viewing rate of the program, the performer attribute and the genre attribute, wherein the niche taste corresponds to a low viewing rate;
selecting a similar performer to the performer based on the performer attribute and the genre attribute;
selecting a program to be recommended from a plurality of programs in a program guide based on a similar performer attribute of the similar performer to the performer;
determining that the program to be recommended corresponds to the niche taste; and
recommending the program to be recommended to an audience with the niche taste.

19. The non-transitory computer readable storage medium of claim 18, wherein the similar performer is a frequent co-star of the performer.

20. The non-transitory computer readable storage medium of claim 18, wherein the operations further comprise:
selecting a non-niche performer that is similar to the performer from the performer relation network of the performer without considering the niche taste;
selecting a second program to be recommended from a plurality of programs in a program guide based on a performer attribute corresponding to the non-niche performer; and
recommending the second program to be recommended to the audience with the niche taste.

* * * * *